(12) United States Patent
Hattori

(10) Patent No.: US 8,717,635 B2
(45) Date of Patent: May 6, 2014

(54) IMAGE PROCESSING APPARATUS, METHOD, PROGRAM AND STORAGE MEDIUM FOR DETERMINING AN IMAGE AREA READ BY A READING DEVICE CORRESPONDING TO AN ORIGINAL IMAGE AREA

(75) Inventor: Yusuke Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 12/774,572

(22) Filed: May 5, 2010

(65) Prior Publication Data

US 2010/0284043 A1 Nov. 11, 2010

(30) Foreign Application Priority Data

May 7, 2009 (JP) ................................. 2009-112976

(51) Int. Cl.
*H04N 1/40* (2006.01)
*G06K 9/00* (2006.01)

(52) U.S. Cl.
USPC ............ 358/448; 358/449; 358/1.9; 358/520; 382/199

(58) Field of Classification Search
None
See application file for complete search history.

(56) References Cited

U.S. PATENT DOCUMENTS

| 5,638,496 | A | * | 6/1997 | Sato | ................................ | 358/1.9 |
| 6,023,538 | A | * | 2/2000 | Noguchi et al. | .............. | 382/312 |
| 6,192,152 | B1 | * | 2/2001 | Funada et al. | ................ | 382/199 |
| 6,366,358 | B1 | * | 4/2002 | Satou et al. | ................... | 358/1.14 |
| 6,801,636 | B2 | * | 10/2004 | Murakami et al. | ............ | 382/100 |
| 7,046,399 | B2 | * | 5/2006 | Endo | ............................. | 358/3.26 |
| 7,170,647 | B2 | * | 1/2007 | Kanatsu | ........................ | 358/453 |
| 7,391,917 | B2 | * | 6/2008 | Ohta et al. | .................... | 382/253 |
| 7,848,589 | B2 | * | 12/2010 | Hasegawa et al. | ............ | 382/266 |
| 2007/0025617 | A1 | * | 2/2007 | Dai et al. | ....................... | 382/180 |
| 2007/0263256 | A1 | * | 11/2007 | Sakaue | ........................ | 358/3.06 |

FOREIGN PATENT DOCUMENTS

| JP | 05-014703 | A | | 1/1993 |
| JP | 11-331547 | A | | 11/1999 |
| JP | 2001-268367 | | * | 9/2001 |
| JP | 2002-010059 | A | | 1/2002 |
| JP | 2005-285010 | A | | 10/2005 |
| JP | 2006-048626 | | | 2/2006 |
| JP | 2008-167009 | A | | 7/2008 |

* cited by examiner

*Primary Examiner* — Steven Kau
(74) *Attorney, Agent, or Firm* — Canon USA Inc. IP Division

(57) ABSTRACT

An image processing apparatus which detects a plurality of image areas included in an original plate image to extract a minimum rectangular area including the plurality of image areas, specifies maximum eight line segments acquired by extending four sides of the rectangular area toward corresponding four sides of the original plate image, respectively, extracts pixels existing in a neighborhood area including each of the specified line segments, and determines that the rectangular area and the minimum rectangular area including the extracted pixels are the areas of the original image. With the configuration, the image processing apparatus can accurately decide only an original area even if edge information of an original extracted from a read image is unclear.

15 Claims, 8 Drawing Sheets

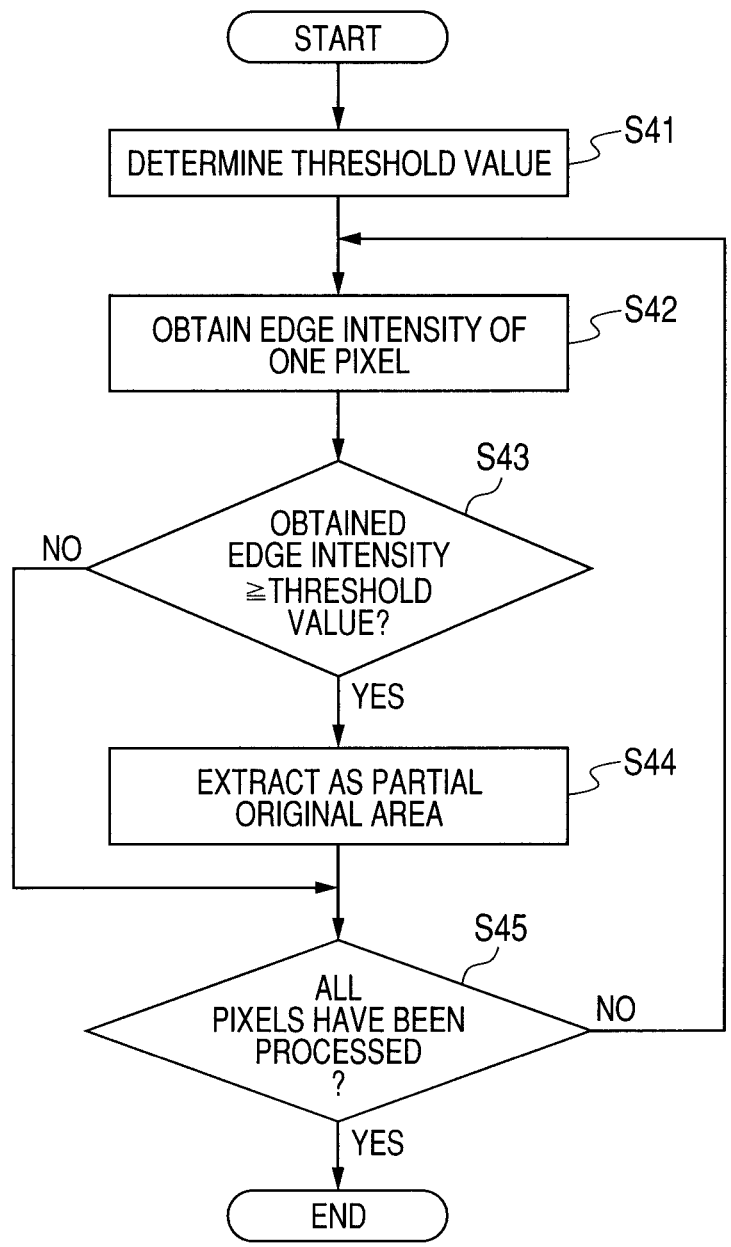

IMAGE PROCESSING APPARATUS, METHOD, PROGRAM AND STORAGE MEDIUM FOR DETERMINING AN IMAGE AREA READ BY A READING DEVICE CORRESPONDING TO AN ORIGINAL IMAGE AREA

BACKGROUND OF THE INVENTION

1. Field of the Invention

The present invention relates to an image processing apparatus for reading an original put on an original plate (or copyboard) of an image reading apparatus, processing thus read image, and outputting. More particularly, the invention relates to an image processing apparatus for trimming only an image area of an original put on an original plate and outputting.

2. Description of the Related Art

An imaging scanner, a multifunction apparatus, and the like can be mentioned as image input devices which are used when data of a paper media is converted into digital data and sent into a PC or the like. Those image input devices can read many various kinds of documents such as monochromatic image like a character original or the like, color image like a magazine, developed photograph, and negative and positive films.

In the case of reading the original, according to a method in the related art whereby the user designates a reading range of the original plate and reads the original on the original plate, there is a case where the user designates the reading area including a range out of an area of the original to be read. To avoid such a problem, such a function that a range of the area to be read is discriminated from a result obtained by analyzing image data derived by reading the whole original plate and the image data of the decided portion is trimmed and output as an area of the original, has been proposed.

Further, such a function that when a plurality of originals are put on the original plate in a lump, an area of each original is trimmed from image data obtained by reading a rectangular area including all areas of the plurality of originals on the original plate and output, has been proposed. Such a function that a rectangular area of each of areas of a plurality of originals is read and images of the originals are output, has also been proposed.

In those functions, it is important that the area of the original to be trimmed is precisely discriminated from the image data obtained by reading the original plate. According to a general discriminating method, luminance and saturation of the read image data are calculated, an edge extraction and a threshold value process are executed, and an original area and a non-original area in the read image data are discriminated. In this case, if there are very similar a color of the original and a color of parts of an image reading apparatus serving as a background of the read image data, since the luminance and saturation of the original area in the read image data and those of the non-original area, discriminating precision deteriorates. If the threshold value upon reading is changed and it is intended to discriminate the original area from the non-original area in which their luminance values or their saturation values are very similar, there is a case where it is determined that noises existing in the read image are the original area.

As a method of precisely discriminating the original area from the read image, a method whereby a pattern is formed to parts of the image reading apparatus serving as a background of the read image, thereby discriminating a reading target area from other portions, has been known as Japanese Patent Application Laid-Open No. 2001-268367.

A method whereby an image in a state where no original is set is previously held and a difference between the held image and a read image is calculated, thereby determining a reading target area, has been known as Japanese Patent Application Laid-Open No. 2006-048626.

However, there is such a problem that if the pattern is formed to the parts of the image processing apparatus, working costs are needed. In the case of preliminarily holding an image in an original-absence state, a memory to hold the image is necessary. Further, there is such a problem that in association with the deterioration of the image processing apparatus, it is necessary to newly read and set the image in the original-absence state, efficiency is low, and usability is also low.

SUMMARY OF THE INVENTION

According to the invention, there is provided an image processing apparatus which can accurately determining and extract an original area from an image read by an image reading apparatus even if edge information of an extracted original is unclear, comprising; a threshold value setting unit configured to set first and second threshold values adapted to determine pixels constructing edges of the original image from the image, a first detecting unit configured to detect the pixels which are included in the image and have values of the first threshold value or more, a first extracting unit configured to extract a rectangular area including the pixels detected by the first detecting unit, a line segment specifying unit configured to specify line segments acquired by extending four sides of the rectangular area toward corresponding four sides of the image, respectively, a second detecting unit configured to detect the pixels which have values of the second threshold value or more and exist near each of the line segments specified by the line segment specifying unit, a determining unit configured to determine that the rectangular area and a rectangular area including the pixels detected by the second detecting unit are the original images; and a second extracting unit configured to extract the original images determined by the determining unit.

According to the invention, even in the case where edge portions of original end portions cannot be extracted due to factors such as color, thickness, and the like of the original put on an original plate and an area of the original is determined to be smaller than an inherent area of the original, the original area is corrected and the correct original area can be extracted.

Further features of the present invention will become apparent from the following description of exemplary embodiments with reference to the attached drawings.

BRIEF DESCRIPTION OF THE DRAWINGS

FIG. 10 is a flowchart for analyzing characteristics of the extended line segment in the embodiment.

DESCRIPTION OF THE EMBODIMENTS

Embodiment 1

Figure 1:
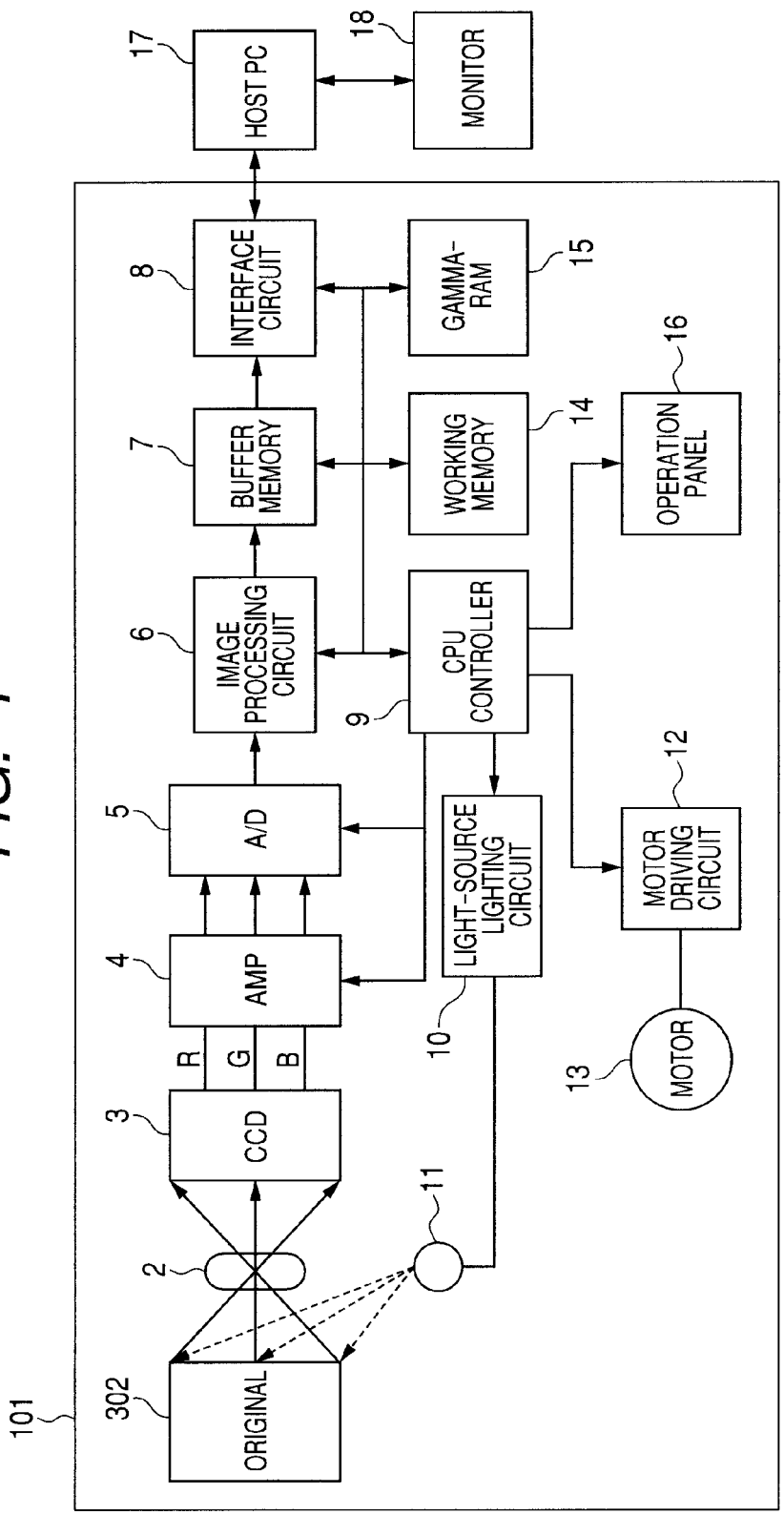
FIG. 1 is a block diagram illustrating a scanner 101.

FIG. 1 is a block diagram illustrating a scanner 101 according to an embodiment 1 of the invention.

The scanner 101 is an example of an image processing apparatus. A light-source lamp 11 irradiates an original 302. Reflection light of intensity corresponding to concentration of the original surface passes through an image pickup lens 2 and is formed as an image onto a line image sensor such as a CCD 3 serving as a solid state image pickup device (or solid state image sensor).

A light-source lighting unit 10 turns on the light-source lamp 11. An amplifier 4 amplifies analog image signal outputs of the line image sensor. A motor driving circuit 12 drives an optical system driving motor 13 such as a stepper motor and outputs an exciting signal of the driving motor 13 by a control signal from a CPU controller 9 serving as a system control unit of the scanner 101.

An A/D converter 5 converts the analog image signals which were output from the amplifier 4 into a digital image signal. An image processing circuit 6 executes image processes such as offset correction, shading correction, digital gain control, color balance adjustment, color masking conversion, and resolution conversion in the main/sub-scan directions, with reference to the image signal converted into the digital signal.

A buffer memory 7 is constructed by a RAM and temporarily stores the image data. An interface circuit 8 intervenes commands and image communication with a connected host PC 17. The interface circuit 8 is constructed by a USB interface, IEEE1394, wired/wireless LAN, or the like.

A working memory 14 is used as a temporary working memory when the image processing circuit 6 executes the image processes. The working memory 14 is used for correction or the like of offsets among RGB lines held in the image signals from the RGB line sensors arranged in parallel on the line image sensor such as a CCD 3, with predetermined offsets. The working memory 14 also temporarily stores various kinds of data of the shading correction and the like.

A gamma-RAM 15 stores a concentration gamma conversion LUT. The concentration gamma conversion LUT is used to make a gamma correction. In accordance with commands from the connected host PC, the CPU controller 9 controls the scanner 101 and controls the motor driving circuit 12, light-source lighting unit 10, image processing circuit 6, and the like.

A state where a switch provided for an operation panel 16 has been pressed is detected by the CPU controller and notified to the connected host PC through the interface.

Although the 3-line CCD 3 for reading three colors of RGB and the light-source lamp 11 are used in the embodiment 1, a function similar to that mentioned above can be also realized by a construction including a monochromatic I-line image sensor and a light source of three RGB colors which can be selectively turned on.

Although not illustrated, the light source is constructed by LEDs of three colors, the CPU controller 9 allows the light-source lighting unit 10 to turn on the light-source LED of one of the three colors, and the turn-on irradiation light is read by the image sensor. By sequentially switching the LEDs to be turned on and reading the light, the original image can be color-separated by a light emitting color of the light source and read.

Figure 2:
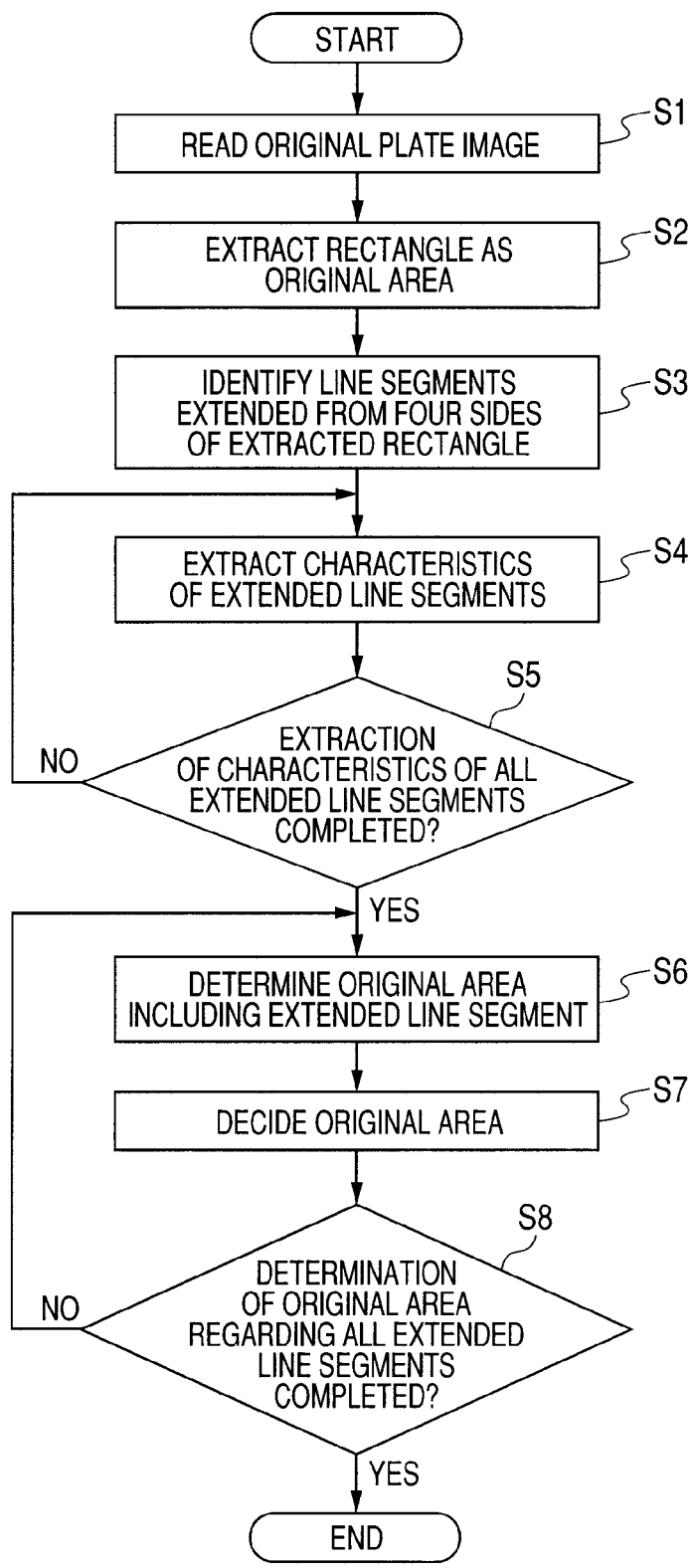
FIG. 2 is a flowchart for the reading operation of the scanner 101 in the embodiment 1.

FIG. 2 is a flowchart illustrating the reading operation of the scanner 101 by the host PC 17 in the embodiment 1.

Figure 3:
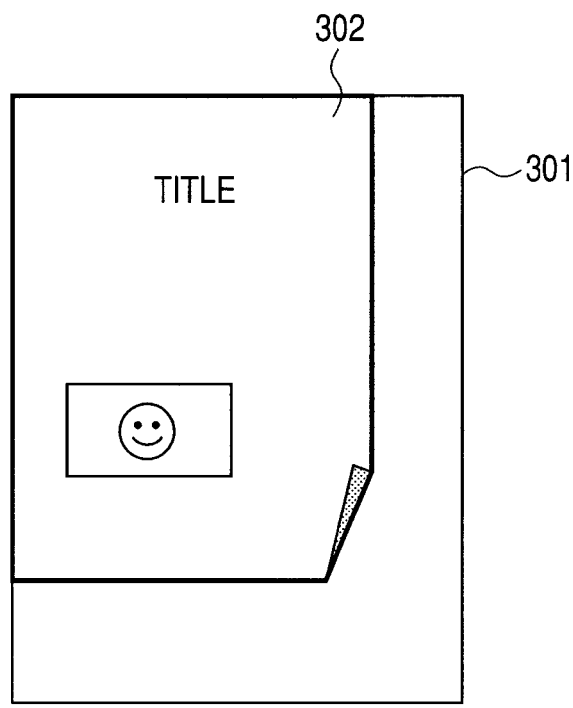
FIG. 3 is a diagram illustrating a state where an original 302 has been put onto an original plate 301 in the embodiment 1.

FIG. 3 is a diagram illustrating a state where the original 302 has been put onto an original plate (or copyboard) 301 in the embodiment 1.

As illustrated in FIG. 3, it is assumed that the original 302 on which a reading target was written has been put onto the original plate 301. In step S1 in the flowchart illustrated in FIG. 2, the whole image (original plate image) on the original plate 301 is read out of the scanner. Resolution at the time of reading may be either temporary resolution or desired resolution of the user. In step S2, a plurality of image areas (original areas) included in the image is extracted from the read image data. A minimum rectangular area including the plurality of image areas is extracted as a reading target area.

Figure 4:
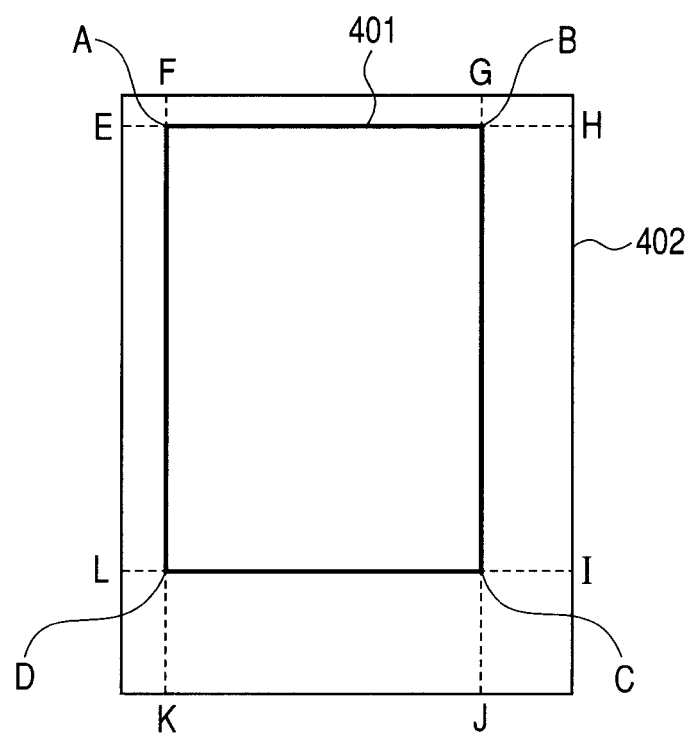
FIG. 4 is a diagram illustrating read image data 402 and a rectangle 401.

FIG. 4 is a diagram illustrating image data 402 of the original plate image obtained by reading the whole original plate 301 and a rectangle 401 which has vertices A, B, C, and D and has been extracted as a reading target.

In FIG. 4, it will be understood that a part (line segments BG and DL) of the original 302 is not extracted. The image data 402 obtained by reading the whole original plate is equal to the area of the original plate 301 in FIG. 3.

When comparing FIGS. 3 and 4 here, the area of the original 302 and the area of the rectangle 401 do not coincide. This is because the line segments BG and DL which are inherently a part of sides of the original 302 are not extracted.

Subsequently, in step S3, extended line segments as line segments extended from the edges of the image data 402 obtained by reading each side of the rectangle 401 extracted in step S2 are specified.

Line segments AE, AF, BG, BH, CI, CJ, DK, and DL specified in step S3 are illustrated in FIG. 4.

The process for specifying the extended line segments (step S3) may be executed to all four sides of the rectangle as a reading target extracted from the image data read in step S2 or can be also executed only to a part of the sides.

Subsequently, in step S4, characteristics of a neighborhood area including the extended line segment (line segment AE, AF, BG, BH, CI, CJ, DK, or DL) specified in step S3 are extracted. A method of extracting the characteristics of the extended line segments will be described in detail hereinafter.

The process of step S4 is executed to all of the extended line segments specified in step S3.

Figure 5:
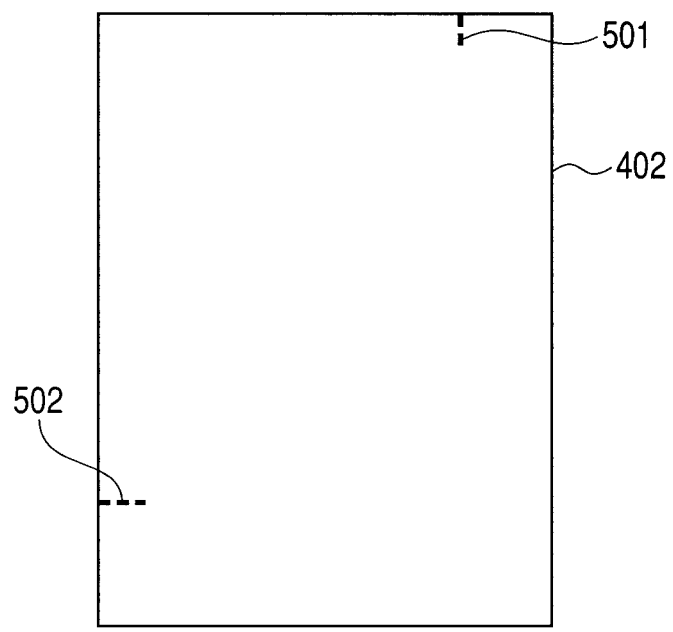
FIG. 5 is a diagram illustrating pixel groups 501 and 502 whose characteristics were extracted in step S4.

FIG. 5 is a diagram illustrating pixel groups 501 and 502 whose characteristics were extracted in step S4.

The pixel groups 501 and 502 exist rectilinearly and continuously on the line segments BG and DL illustrated in FIG. 4. The original end portions of the original 302 exist actually on the line segments BG and DL.

Subsequently, in step S6, characteristics extraction result (step S4) is analyzed, the reading target area in the extended line segments is determined, and pixels as reading targets in the extended line segments are extracted. A method of determining the reading target area in the extended line segments will be described hereinafter.

Figure 6:
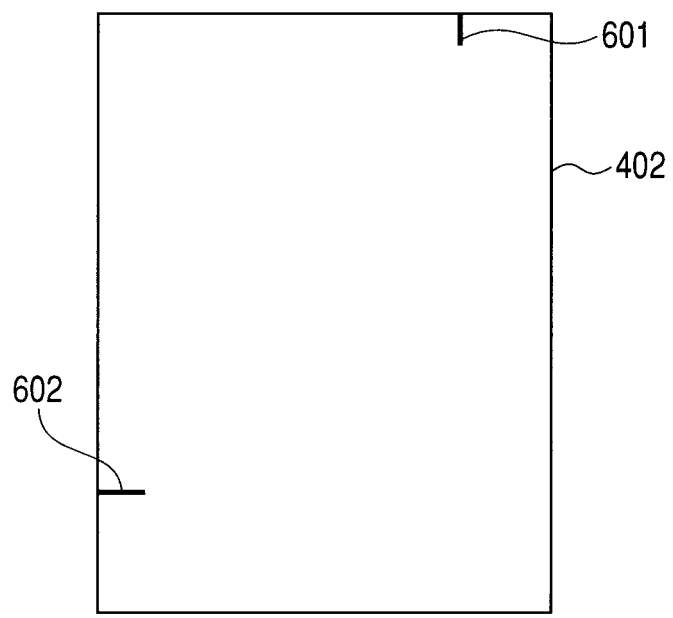
FIG. 6 is a diagram illustrating extracted areas 601 and 602.

FIG. 6 is a diagram illustrating extracted areas 601 and 602 which were determined as a part of the reading targets in step S6 after completion of the extraction of the characteristics of all of the extended line segments in step S5.

Subsequently, in step S7, a rectangle including the areas 601 and 602 which were determined as a part of the reading targets in step S6 and the rectangle 401 extracted in step S2 is determined again as an original area of the original image. In this instance, a rectangle including all of the extended line segments including the areas 601 and 602 which were determined as a part of the original area in step S6 and the rectangle 401 extracted in step S2 may be determined as an original area again.

Subsequently, in step S8, whether or not the process of step S6 has been executed to all of the extended line segments specified in step S3. If they were all processed, the processing routine is finished.

Figure 7:
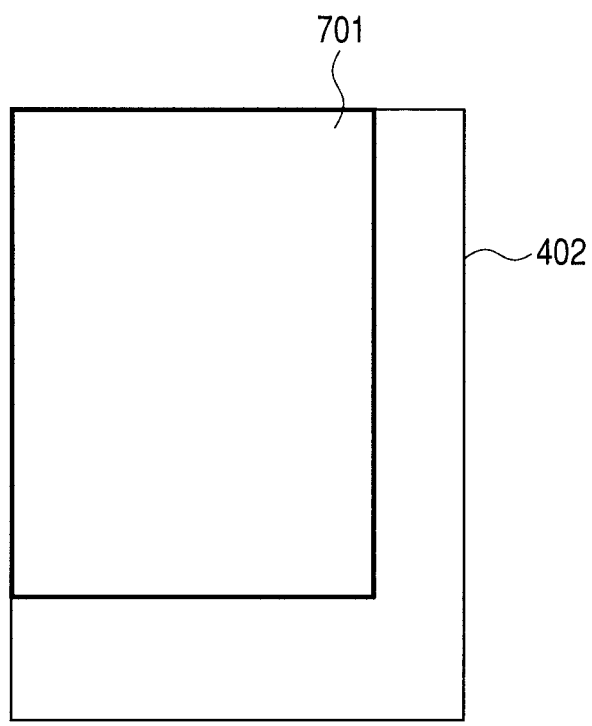
FIG. 7 is a diagram illustrating an original area rectangle 701 in which step S6 was processed and which has been determined again.

FIG. 7 is a diagram illustrating an original area rectangle 701 in which step S6 was processed and which has been determined again with respect to all of the extended line segments specified in step S3.

The original area rectangle 701 is the original area which was finally decided. When comparing FIGS. 7 and 3, it will be understood that the original area has accurately been extracted.

Figure 8:
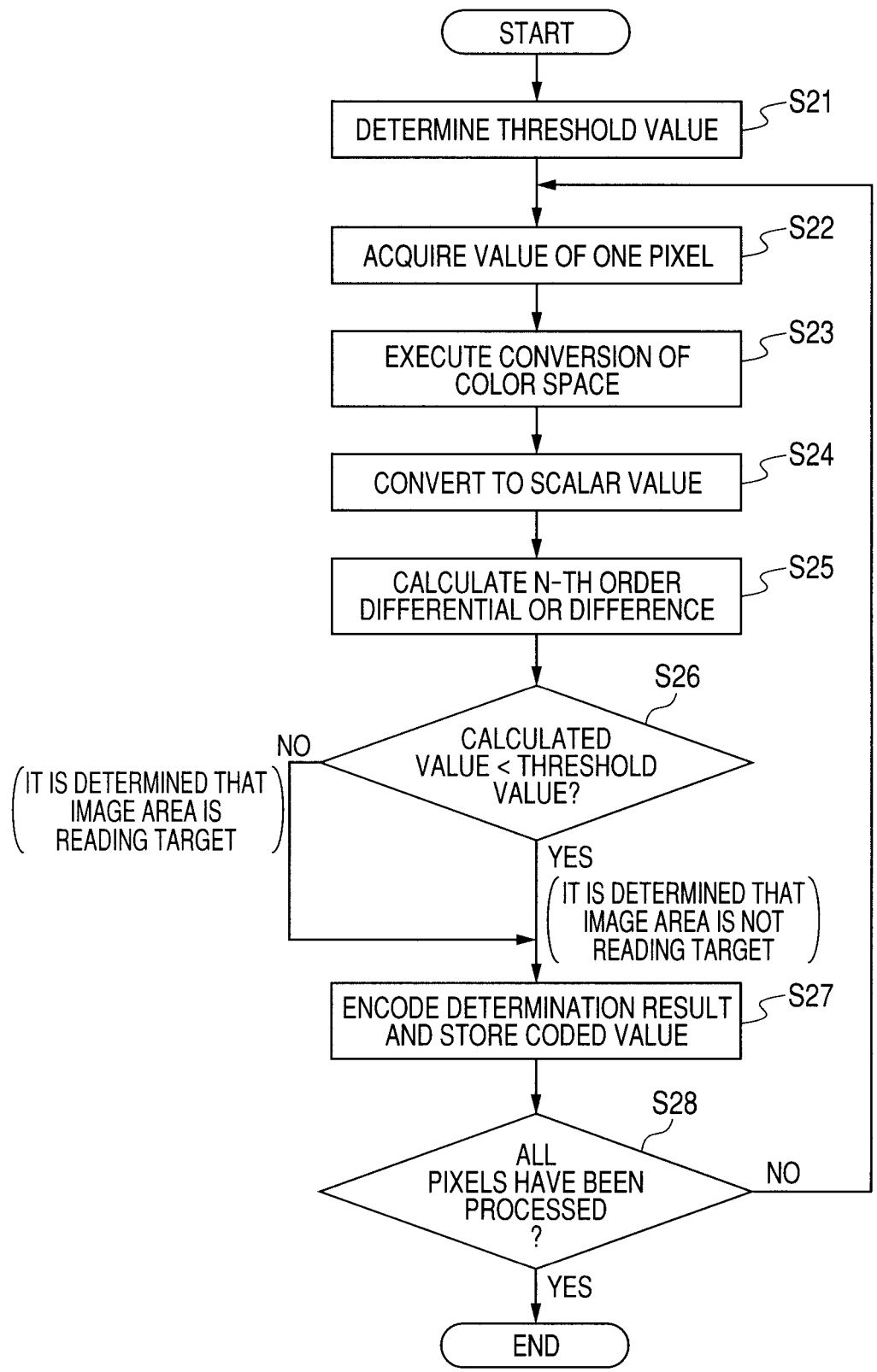
FIG. 8 is a flowchart for the operation to extract a reading target area in the embodiment 1.

FIG. 8 is a flowchart illustrating the operation to extract the reading target (original area) in step S2 in FIG. 2 in the embodiment 1.

In step S21, a threshold value to binarize the image data is decided. An optimum value of this threshold value varies depending on a comparing method in step S26, which will be described hereinafter. To simply determine the threshold value, it is sufficient to previously determine a fixed value as a threshold value.

In step S22, a value of certain one pixel is acquired. Although the process has to be executed to all pixels in order to extract the reading target, if the process of step S22 is repeated, the process can be executed every pixel. Ordinarily, a position of certain one pixel is specified by using an X coordinate and a Y coordinate. When the process is started, each of the X coordinate and the Y coordinate is initialized by an initial value (generally, 0), the X coordinate and the Y coordinate are changed each time one pixel is processed, and all pixels are scanned.

In step S23, a color space of the pixel value acquired in step S22 is converted. Generally, the color space of each scanner 101 differs depending on characteristics of the CCD 3, a color filter, and the light-source lamp 11. If a device-independent color space is used, since there is a possibility that the reading target can be extracted irrespective of the scanner 101, the color space is converted in step S23.

In the case of adjusting parameters depending on the scanner 101 and determining the threshold value in the process of step S21, the process of step S23 can be omitted.

In step S24, the value acquired in step S23 is converted into a scalar value. In the case of inputting a color image, it has three color values of RGB. In order to compare the three RGB color values (vector values) with the threshold value (scalar value), the three RGB color values are converted into scalar values. In the case of converting the three RGB color values into the scalar values, there is a method of extracting only one of those colors, a method of getting a proper weight average of the three RGB color values and acquiring a luminance value, a method of calculating saturation from the three RGB color values, or the like. However, if the input image is an image of one color such as a gray scale, since the above process is unnecessary, the process of step S24 can be omitted.

In step S25, an N-th order differential or difference is calculated from the value acquired in step S24. In the process to extract the reading target from the image, there is a possibility that by extracting the original 302 put on the original plate 301 and other boundaries, the subsequent precise determination of the original area becomes easy.

The N-th order differential or difference is calculated in order to extract a boundary of the original 302 put on the original plate 301. Since this process depends on the characteristics of the value acquired in step S24, if unnecessary, the process of step S25 can be omitted.

In step S26, the value acquired in step S25 and the threshold value decided in step S21 are compared. If it is less than the threshold value, it is determined that the image area is not the reading target. If it is equal to or larger than the threshold value, it is determined that the image area is the reading target. However, the above relation is reversed depending on the values acquired in steps S23 to S25 and it is also possible to construct in such a manner that if it is less than the threshold value, it is determined that the image area is the reading target, and if it is equal to or larger than the threshold value, it is determined that the image area is not the reading target. Such a relation is preliminarily determined. For example, in the case of using the luminance value, if the value is less than the threshold value, it is determined that the image area is the reading target, and in the case of using the saturation, if the value is equal to or larger than the threshold value, it is determined that the image area is the reading target.

In step S27, a result of step S26 is stored. Since the result of step S26 indicates only two kinds of information showing whether or not the image area is the reading target, the determination result is encoded in such a manner that if the image area is the reading target, "1" is allocated, and if it is not the reading target, "0" is allocated, or the like, and the coded value is stored.

In step S28, whether or not all pixels have been processed in step S27 is discriminated. If all of the pixels have been processed, the processing routine is finished. Thus, a bundle of pixels as reading targets is detected as an image area.

In the embodiment 1, the processes are executed in order of the flowchart illustrated in FIG. 8. However, there is a case where the result of step S25 is necessary for the decision of the threshold value in step S21. There is also a case where the converted scalar value (step S24) with respect to the adjacent pixel is necessary for the calculation of step S25. The processing order in the flowchart illustrated in FIG. 8 may be exchanged as necessary.

Although the flowchart illustrated in FIG. 8 is executed only one time in the embodiment 1, it may be executed a plurality of number of times in dependence of circumstances. For example, the conversion of the color space is not executed in the process of the first time but the luminance is acquired and processed by a quadratic differential (or secondary differentiation). In the process of the second time, the conversion of the color space is executed, the saturation is acquired, the process of step S25 is skipped, and the saturation is processed. After that, the AND or OR of the two results is acquired and synthesized. Since whether the AND is used or the OR is used depends on the encoding of step S27, it is sufficient to properly decide which one of them is used.

Figure 9:
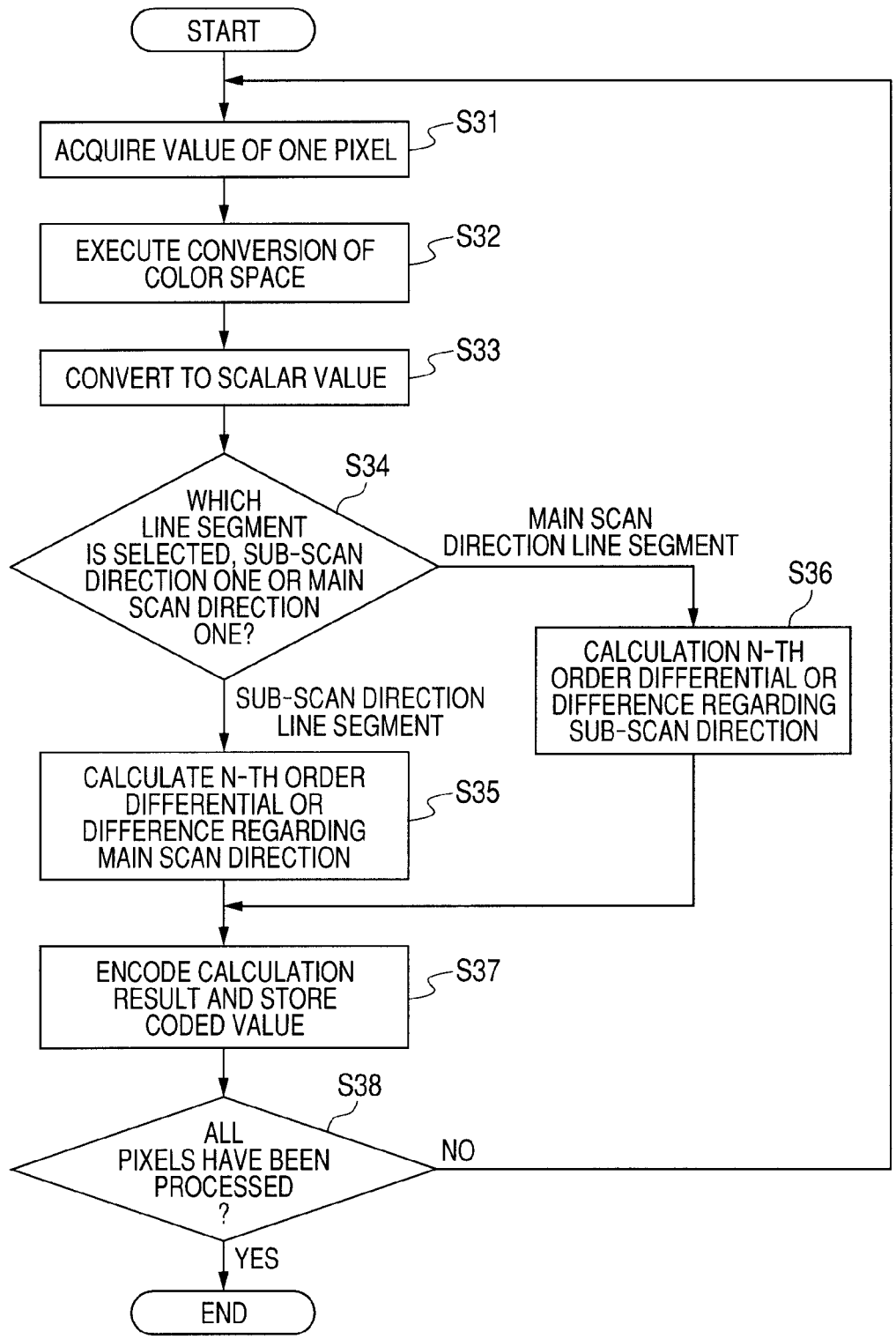
FIG. 9 is a flowchart for extracting edge intensity of an extended line segment in the embodiment 1.

FIG. 9 is a flowchart illustrating the image extraction (extraction of edge intensity) from the area including the extended line segment (line segment AE, AF, BG, BH, CI, CJ, DK, or DL in FIG. 4) (step S4) in the embodiment 1.

Generally, a "characteristics amounts" in the image process are indices acquired by analyzing the image and there are various kinds of indices such as edge intensity, shape, coloring, and the like. In the description, an embodiment using the edge intensity is disclosed as an example of them.

Since processes of steps S31 to S33 are similar to those of steps S22 to S24 illustrated in FIG. 8, their description is omitted here. In step S34, whether the extended line segment which is being processed is the line segment in the main scan direction or the line segment in the sub-scan direction is determined. In the case where the line segment in the sub-scan direction is being processed, the processing routine advances to step S35. In the case where the line segment in the main scan direction is being processed, the processing routine advances to step S36. In step S35, an N-th order differential or difference in the main scan direction is calculated in order to extract edge intensity in the main scan direction.

In step S36, an N-th order differential or difference in the sub-scan direction is calculated in order to extract edge intensity in the sub-scan direction. For example, the right side of the original 302 and the boundary portion of the original plate 301 exist in the extended line segment BG in FIG. 4. Therefore, since the extended line segment BG is the line segment in the sub-scan direction, if the N-th order differential or difference in the main scan direction is calculated in step S35, a difference (edge intensity) between the luminance of the original area portion and the luminance of the original plate area portion can be extracted as characteristics of the extended line segment.

Only the area of the original plate 301 exists in the extended line segment BH illustrated in FIG. 4. Therefore, since the extended line segment BH is the line segment in the main scan direction, even if the N-th order differential or difference in the main scan direction is calculated in step S36, nothing can be extracted. There is a Prewitt filter as an example of a difference processing filter which is used in step S36. The calculation result in step S35 or S36 is stored in step S37. In step S38, whether or not all of the pixels in the extended line segment which is being processed have been processed in step S36 or S37. If all of them have been processed, the processing routine is finished.

FIG. 10 is a flowchart illustrating the operation for analyzing the characteristics of an extended line segment (line segment AE, AF, BG, BH, CI, CJ, DK, or DL in FIG. 4), determining the reading target, and extracting (step S6) in the embodiment.

In step S41, an image area determining threshold value to determine the image area is decided. To simply determine the threshold value, it is sufficient to preliminarily determine a fixed value as a threshold value.

Generally, the extended line segment (line segment AE, AF, BG, BH, CI, CJ, DK, or DL in FIG. 4) is the portion determined to be not the reading target in the process of step S2 in FIG. 2. Therefore, the image area determining threshold value which is decided in step S41 is set to be smaller than the threshold value used in step S2. That is, it is set to such a value that even in the case of the small edge intensity, the image area is determined as a reading target.

In step S42, edge intensity of the certain one pixel stored in step S4 is acquired. In step S43, the threshold value decided in step S41 is compared with the edge intensity acquired in step S42. If the edge intensity acquired in step S42 is less than the threshold value, it is determined that the image area is not the reading target, and the processing routine advances to step S45. If the edge intensity acquired in step S42 is equal to or larger than the threshold value, the processing routine advances to step S44 and the image area is extracted as a reading target and stored. In step S45, whether or not all pixels in the extended line segment have been processed in step S43. If all of them have been processed, the processing routine is finished.

In place of the processes in steps S41 to S45, characteristics may be extracted in a manner similar to step S4 with respect to four sides of the rectangle 401 extracted in step S2. In this case, the edge intensity acquired in this manner is compared with the edge intensity of the extended line segment, thereby discriminating the reading target.

That is, the edge extracting process illustrated in FIG. 9 is executed to the four sides of the rectangle 401. A density of the edge intensity in the extended line segment is compared with a density of the edge intensity in one side corresponding to the extended line segment among the four sides of the rectangle 401 as an extraction result. If the density of the edge intensity in the extended line segment is smaller, it is determined that the image area is not the reading target. If it is larger, the image area is extracted as a reading target and stored.

The extended line segment obtained by extending in the sub-scan direction from the vertex of the rectangle 401 extracted in step S2 corresponds to the side of the rectangle 401 extracted in step S2 in the main scan direction from the vertex. The extended line segment obtained by extending in the main scan direction from the vertex of the rectangle 401 extracted in step S2 corresponds to the side of the rectangle 401 extracted in step S2 in the sub-scan direction from the vertex.

For example, the side AD of the rectangle 401 extracted in step S2 corresponds to the extended line segment DL in FIG. 4. That is, the edge intensity of the extended line segment DL and the edge intensity of the side AD are compared. A numerical value α obtained by dividing the sum of the pixels in which the edge intensity in the extended line segment DL is equal to or larger than the threshold value by the area of the extended line segment DL is compared with a numerical value β obtained by dividing the sum of the pixels in which the edge intensity in the side AD is equal to or larger than the threshold value by the area of the side AD. If the numerical value α is larger than the numerical value β, it is determined that the extended line segment DL is a part of the original area and extracted.

Since a boundary portion between the lower side of the original 302 and the original plate 301 exist in the extended line segment DL, the edge intensity is uniformly extracted on the extended line segment DL by the process of step S4. A difference of the luminance values of the contents portions such as characters, photograph, and illustration in the original 302 is merely acquired as edge intensity in the side AD of the rectangle 401 and they are deviated to a part on the side AD in many cases. Therefore, in comparison between the numerical value α obtained by dividing the sum of the pixels in which the edge intensity in the extended line segment DL is equal to or larger than the threshold value by the area of the extended line segment DL and the numerical value β obtained by dividing the sum of the pixels in which the edge intensity in the side AD is equal to or larger than the threshold value by the area of the side AD, the numerical value α is larger than the numerical value β in many cases.

The scanner 101 is an example of the image processing apparatus for acquiring the original image from the original plate image obtained by reading the whole surface of the original plate image including the original on the original plate.

The image processing circuit 6 is an example of a first extracting unit for detecting a plurality of image areas included in the original plate image and extracting the minimum rectangular area including the plurality of image areas. The rectangle 401 is an example of the minimum rectangular area.

The image processing circuit 6 is an example of a line segment specifying unit for specifying maximum eight line segments which are obtained by extending both edges of each of the four sides of the upper side, lower side, left side, and right side of the rectangular area toward the upper side, lower side, left side, and right side of the original plate image, respectively. The read image data 402 is an example of the original plate image.

The image processing circuit 6 is an example of a second extracting unit for extracting the pixels existing in the neighborhood area including each of the specified line segments. The area obtained by expanding the line segment AE, AF, BG, BH, CI, CJ, DK, or DL in accordance with the value of N is an example of the neighborhood area including each of the specified line segments. The pixel groups 501 and 502 are an example of the pixels existing in the neighborhood area including each of the specified line segments.

The image processing circuit 6 is an example of a determining unit for determining that the rectangular area and the minimum rectangular area including the pixels extracted by the second extracting unit are the areas of the original image.

In the case where the extracted image is constructed by a plurality of pixels which continue rectilinearly, they are determined as pixels which are extracted as they are, by the second extracting unit. Or, in the case where the edge intensity of the pixel and the edge intensity of the first image area are compared and the edge intensity of the pixel is larger than the edge intensity of the first image area, they are determined as pixels which are extracted by the second extracting unit. The pixel groups 501 and 502 are an example of the plurality of pixels which continue rectilinearly. The edge extracting process illustrated in FIG. 9 is executed to the first candidate pixel group and the density of the edge intensity and the characteristics pixel group (edge intensity) are compared. If it is determined that the edge intensity of the characteristics pixel group is larger, they are decided as a second candidate pixel group.

Embodiment 2

An embodiment 2 relates to program codes of software for realizing the functions of the embodiment 1. A storage medium in which the program codes of the software have been stored is also an embodiment. It is also possible to construct in such a manner that the program codes in the storage medium are supplied to a system or an apparatus, a computer (or a CPU or MPU) of the system or apparatus reads out and executes the program codes stored in the storage medium.

In this case, the program codes themselves read out of the storage medium realize the functions of the embodiments as mentioned above. The storage medium in which the program codes have been stored constructs the invention.

As a storage medium for supplying the program codes, for example, a flexible disk, a hard disk, an optical disk, a magnetooptic disk, a CD-ROM, a CD-R, a magnetic tape, a nonvolatile memory card, a ROM, or a DVD can be used.

The functions of the embodiments mentioned above are also realized by a method whereby a computer executes the read-out program codes. An Operating System (OS) or the like which is operating on the computer executes a part or all of the actual processes based on instructions of the program codes and the functions of the embodiments mentioned above are realized by those processes.

Further, it is also possible to construct in such a manner that the program codes read out of the storage medium are written into a memory provided for a function expanding board inserted into the computer or a function expanding unit connected to the computer and, after that, a CPU or the like provided for the function expanding board or function expanding unit executes a part or all of the actual processes. In this case, the functions of the embodiments mentioned above are also realized by those processes.

That is, the embodiment is an example of the program for making the computer function as each of the units constructing the foregoing image processing apparatus. The embodiment is an example of the computer-readable storage medium in which the program for making the computer function as each of the units constructing the foregoing image processing apparatus has been stored.

By changing each of the units constructing the foregoing embodiment to a processing step, the embodiment can be grasped as the invention of the image processing method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-112976, filed on May 7, 2009, which is hereby incorporated by reference herein in its entirety.

What is claimed is:

1. An apparatus, comprising:
   an acquiring unit configured to acquire a read image acquired by reading an original by a reading apparatus;
   a specifying unit configured to specify, in the read image acquired by the acquiring unit, a line segment having a first characteristic amount which is not less than a first threshold value as a candidate of an edge of the original, the line segment being a part of the read image and the first characteristic amount being a part of a characteristic amount of the read image;
   a deciding unit configured to decide, in case where the line segment specified by the specifying unit is extended in the read image including the line segment, whether a second characteristic amount of the extended line segment is not less than a second threshold value smaller than the first threshold value, the extended line segment being a part of the read image and the second characteristic amount being a part of a characteristic amount of the read image; and
   a determining unit configured to determine an area corresponding to the original in the read image, based on the line segment specified by the specifying unit and the extended line segment, in a case where the deciding unit decides that the second characteristic amount is not less than the second threshold value.

2. The apparatus according to claim 1, further comprising: an extracting unit configured to extract a rectangular area based on the line segment specified by the specifying unit in the read image as a candidate of an area corresponding to the original, wherein the extended line segment is an extended line segment in case where a side of the rectangular area extracted by the extracting unit is extended.

3. The apparatus according to claim 2, wherein if the deciding unit decides that in case where a side of a first rectangular area extracted by the extracting unit is extended, the second characteristic amount is not less than the second threshold value, the determining unit determines a second rectangular area including a side of the first rectangular area and a side of the extended line segment as an area corresponding to the original.

4. The apparatus according to claim 2, wherein the determining unit determines as an area corresponding to the original based on extended line segments in case where four sides of the rectangular area extracted by the extracting unit are extended.

5. The apparatus according to claim 1, wherein the characteristic amount of the read image is an edge intensity.

6. A method, comprising:
acquiring a read image acquired by reading an original by a reading apparatus;
specifying, in the read image as acquired, a line segment having a first characteristic amount which is not less than a first threshold value as a candidate of an edge of the original, the line segment being a part of the read image and the first characteristic amount being a part of a characteristic amount of the read image; and
determining an area corresponding to the original in the read image, based on the line segment as specified and the extended line segment, if it is decided that in case where the line segment as specified is extended in the read image including the line segment, a second characteristic amount of the extended line segment is not less than a second threshold value smaller than the first threshold value, the extended line segment being a part of the read image and the second characteristic amount being a part of a characteristic amount of the read image.

7. The method according to claim 6, further comprising:
extracting a rectangular area based on the line segment specified in the read image as a candidate of an area corresponding to the original,
wherein the extended line segment is an extended line segment in case where a side of the rectangular area as extracted is extended.

8. The method according to claim 7, wherein if it is decided that in case where a side of a first rectangular area as extracted is extended, the second characteristic amount is not less than the second threshold value, that a second rectangular area including a side of the first rectangular area and a side of the extended line segment are determined as an area corresponding to the original.

9. The method according to claim 7, wherein an area corresponding to the original is determined based on extended line segments in case where four sides of the rectangular area extracted by the extracting unit are extended.

10. The method according to claim 6, wherein the characteristic amount of the read image is an edge intensity.

11. A non-transitory computer-readable storage medium, storing a computer-executable process, the computer-executable process causing a computer to execute a method, comprising:
acquiring a read image acquired by reading an original by a reading apparatus;
specifying, in the read image as acquired, a line segment having a first characteristic amount which is not less than a first threshold value as a candidate of an edge of the original, the line segment being a part of the read image and the first characteristic amount being a part of a characteristic amount of the read image; and
determining an area corresponding to the original in the read image, based on the line segment as specified and the extended line segment, if it is decided that in case where the line segment as specified is extended in the read image including the line segment, a second characteristic amount of the extended line segment is not less than a second threshold value smaller than the first threshold value, the extended line segment being a part of the read image and the second characteristic amount being a part of a characteristic amount of the read image.

12. The storage medium according to claim 11, further comprising:
extracting a rectangular area based on the line segment specified in the read image as a candidate of an area corresponding to the original,
wherein the extended line segment is an extended line segment in case where a side of the rectangular area as extracted is extended.

13. The storage medium according to claim 12, wherein if it is decided that in case where a side of a first rectangular area as extracted is extended, the second characteristic amount is not less than the second threshold value, that a second rectangular area including a side of the first rectangular area and a side of the extended line segment are determined as an area corresponding to the original.

14. The method according to claim 12, wherein an area corresponding to the original is determined based on extended line segments in case where four sides of the rectangular area extracted by the extracting unit are extended.

15. The method according to claim 11, wherein the characteristic amount of the read image is an edge intensity.

* * * * *